(12) United States Patent
Wejrowski

(10) Patent No.: US 8,381,688 B1
(45) Date of Patent: Feb. 26, 2013

(54) ANIMAL HARNESS

(75) Inventor: Laura Wejrowski, Dallas, TX (US)

(73) Assignee: Gemini Creations LLC, Dallas, TX (US)

( * ) Notice: Subject to any disclaimer, the term of this patent is extended or adjusted under 35 U.S.C. 154(b) by 256 days.

(21) Appl. No.: 12/928,476

(22) Filed: Dec. 13, 2010

Related U.S. Application Data

(60) Provisional application No. 61/284,216, filed on Dec. 15, 2009.

(51) Int. Cl.
*A01K 27/00* (2006.01)
*A62B 35/00* (2006.01)

(52) U.S. Cl. ......................... 119/792; 119/863

(58) Field of Classification Search .................. 119/769, 119/792, 793, 856, 863, 907
See application file for complete search history.

(56) References Cited

U.S. PATENT DOCUMENTS

| | | | | |
|---|---|---|---|---|
| 1,508,601 A * | 9/1924 | Huff | | 119/792 |
| 4,566,255 A * | 1/1986 | DeGroot | | 54/24 |
| 5,443,037 A * | 8/1995 | Saleme | | 119/771 |
| 5,690,059 A * | 11/1997 | Woods | | 119/856 |
| 5,794,571 A * | 8/1998 | Goldberg | | 119/792 |
| 6,314,915 B1 * | 11/2001 | Pope et al. | | 119/712 |
| 6,679,198 B1 * | 1/2004 | LaGarde | | 119/792 |
| 2003/0066494 A1 * | 4/2003 | Hippensteel | | 119/792 |
| 2008/0072848 A1 * | 3/2008 | David et al. | | 119/792 |
| 2008/0184943 A1 * | 8/2008 | Brauer | | 119/792 |
| 2010/0122667 A1 * | 5/2010 | Horgan | | 119/792 |

* cited by examiner

*Primary Examiner* — Monica Williams
(74) *Attorney, Agent, or Firm* — Thompson & Knight LLP; James J. Murphy

(57) ABSTRACT

An animal harness including first strap adapted to generally lie on a back area of an animal when the harness is disposed on the animal and second strap adapted to generally lie on an underside of the animal when the harness is disposed on the animal. Third strap is coupled to a first end of the first strap and a first end of the second strap, the third strap including a male clasp portion and a corresponding female clasp portion wherein the third strap is adapted to lie in front of a leg of the animal when the harness is disposed on the animal and the male and female clasp portions of the third strap are mated. Fourth strap is coupled to a second end of the first strap and a second end of the second strap, the fourth strap including a male clasp portion and a corresponding female clasp portion wherein the fourth strap is adapted to lie behind the leg of the animal when harness is disposed on the animal and the male and female clasp portions of the fourth strap are mated.

9 Claims, 5 Drawing Sheets

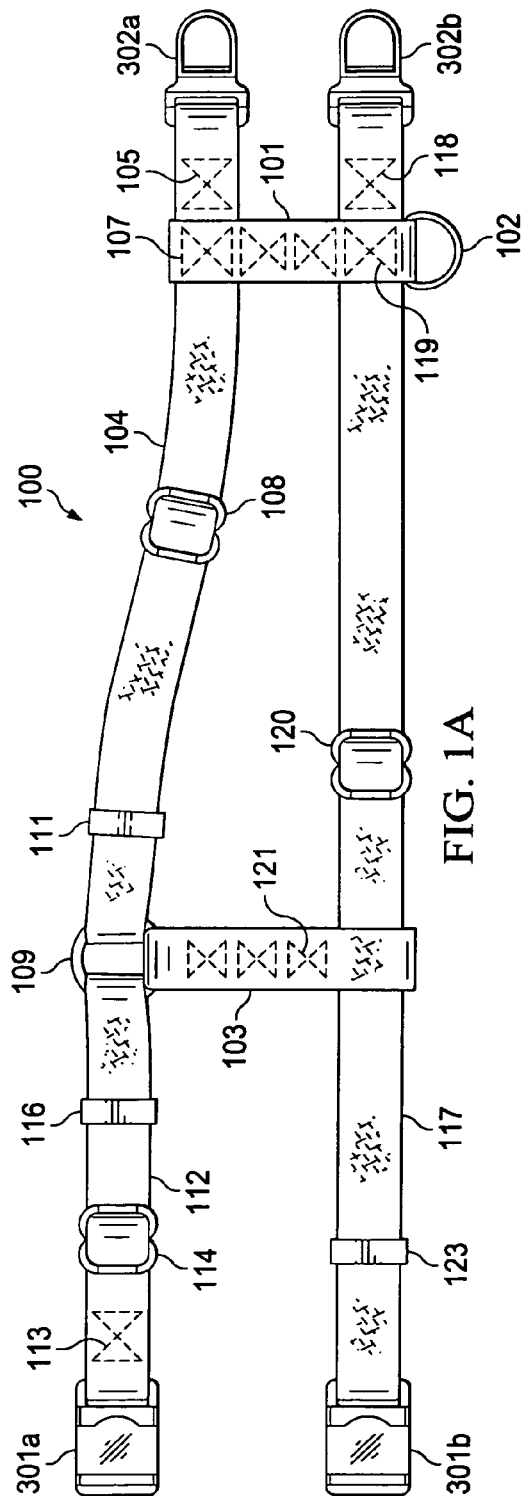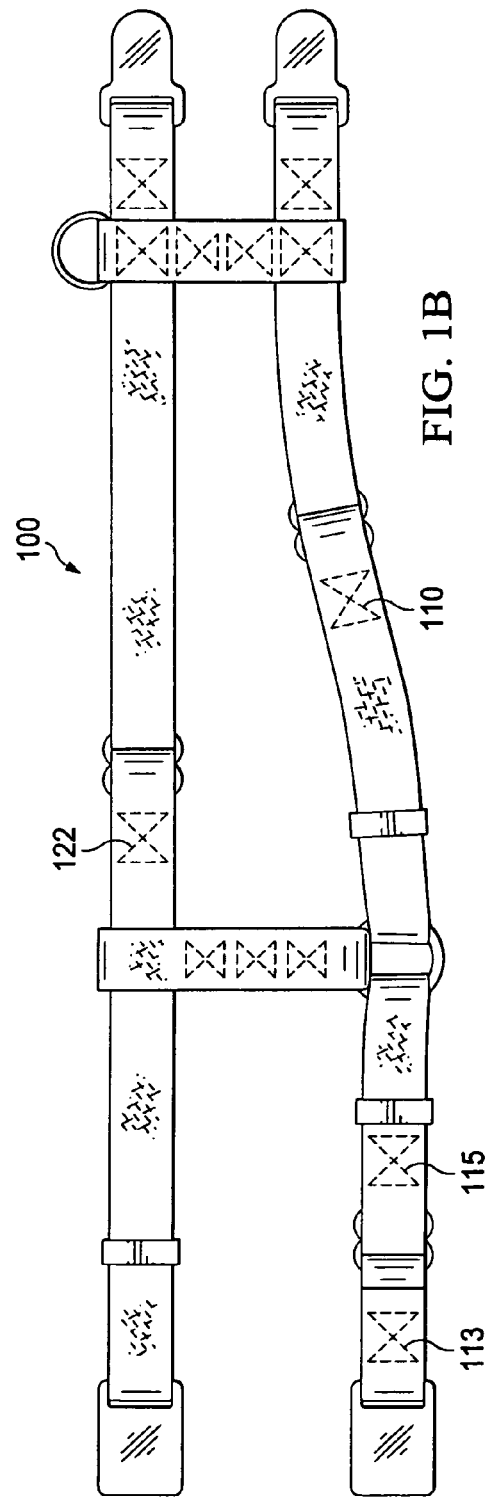

ANIMAL HARNESS

CROSS-REFERENCE TO RELATED APPLICATION

The present application claims the benefit of U.S. Provisional Patent Application Ser. No. 61/284,216, filed Dec. 15, 2009.

FIELD OF INVENTION

The present invention relates in general to pet products, and in particular, to an animal harness.

BACKGROUND OF INVENTION

Pet owners, for example the owners of dogs, often use a harness in lieu of a collar when walking their pet on a leash. Harnesses are particularly advantageous for the owners of small pets, where a traditional collar can press on the neck of the animal causing discomfort or even injury.

Traditional animal harnesses are subject to a number of serious disadvantages. Among other things, with traditional animal harnesses, the human companion must push the neck strap (one piece) over the animal's head, over the ears and down to the neck area. Because, the strap around the neck area must be tight enough to be secure and because the animal's head area is larger, pushing the neck strap over the animals head is uncomfortable for the animal and not easy for the owner. Furthermore, with conventional harnesses, not only does the harness have to be pushed over and down the animal's head, but also the animal's left leg must be contorted in an unnatural way to get through the left side of the harness. Moreover, many human companions do not correctly position traditional harnesses. The correct positioning of a harness is to have the D ring (e.g. the ring allowing connection to a leash) at the rear of the top strap so the leash is attached at the chest area behind the front legs, and not in the neck area in front of the animal's front legs. With standard harnesses it can be different to determine the correct position, and as a result, many people position the harness incorrectly and have the D ring at the front of the top strap of the harness so the leash pulls at the neck area.

Hence, an improved animal harness that would be easier to handle when putting on a pet would be a significant help to pet owners.

SUMMARY OF INVENTION

According to one embodiment of the inventive principles, an animal harness is disclosed, which includes first a strap adapted to generally lie on a back area of an animal when the harness is disposed on the animal and second strap adapted to generally lie on an underside of the animal when the harness is disposed on the animal. A Third strap is coupled to a first end of the first strap and a first end of the second strap, the third strap including a male clasp portion and a corresponding female clasp portion wherein the third strap is adapted to lie in front of a leg of the animal when the harness is disposed on the animal and the male and female clasp portions of the third strap are mated. A Fourth strap is coupled to a second end of the first strap and a second end of the second strap, the fourth strap including a male clasp portion and a corresponding female clasp portion wherein the fourth strap is adapted to lie behind the leg of the animal when harness is disposed on the animal and the male and female clasp portions of the fourth strap are mated.

According to another embodiment of the principles of the present invention, an animal harness is disclosed, which includes a first length of strap for disposition along a portion of a back of an animal and a second length of strap for disposition along a portion of an underside of the animal. A third length of strap has a first end fastened to a first part of a clasp system and a second end looped around a ring, a first end of the first length of strap being fastened to the third length of strap. A fourth length of strap has a first end looped around the ring and a second end fastened to a second part of the clasp system. A fifth length of strap has a first end attached to a third part of the clasp system and a second end attached to a forth part of the clasp system, wherein a second end of the first length of strap is fastened to the fifth length of strap and wherein a first end of the second length of strap is looped around the fifth length of strap and a second end of the second length of strap is looped around the ring. The third and fourth lengths of strap are adapted for disposition around the animal in front of a leg when the first and second parts of the clasp system are fastened together and the fifth length of strap is adapted for disposition around the animal in back of the leg when the third and fourth parts of the clasp system are fastened together.

The embodiments of the principles of the present invention realize substantial advantages over the prior art. Among other things, positioning the harness is simplified, since with the correct positioning of the harness, two buckles are always on top and to the same side of the animal. Additionally, since two clasps are provided, the human companion can place the neck strap around the animal's neck like a collar, without having to go over the head and ears of the animal. Similarly, when taking the inventive harness off the animal, there is no forcing down from the head to the neck or from the neck up over the ears and cranial area of the animal. Furthermore, the human companion can slide the left leg though the left leg opening first and then clasp the rear harness strap closed afterward, which by default is behind the animal's legs. Finally, the back strap and the chest-neck strap are sewn in place so when the human companion unhooks the buckles these straps don't slide around.

BRIEF DESCRIPTION OF DRAWINGS

For a more complete understanding of the present invention, and the advantages thereof, reference is now made to the following descriptions taken in conjunction with the accompanying drawings, in which:

FIGS. 1A and 1B are diagrams providing respective top and bottom views of a preferred animal harness according to the principles of the present invention;

DETAILED DESCRIPTION OF THE INVENTION

Figure 2B:
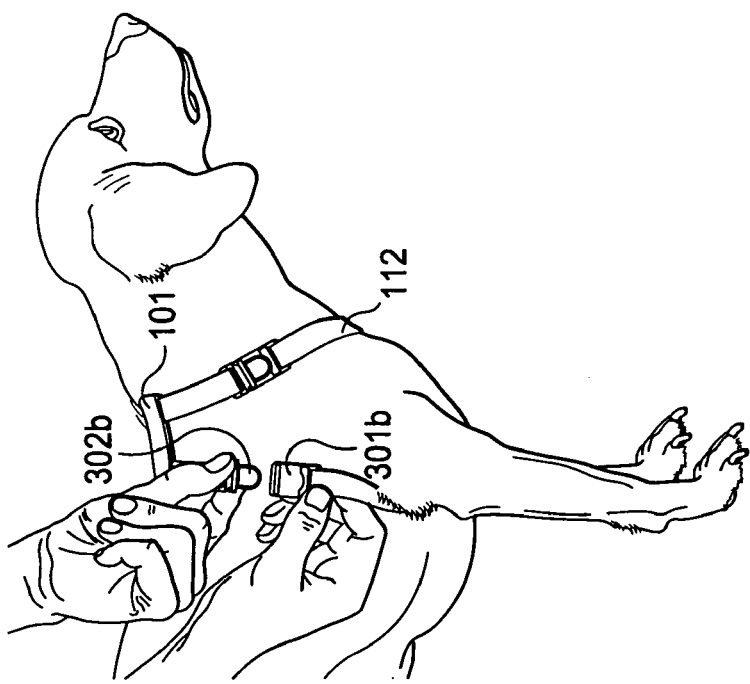
FIG. 2A-2C illustrate a typical use of the animal harness shown in FIGS. 1A-1B.

The principles of the present invention and their advantages are best understood by referring to the illustrated embodiment depicted in FIGS. 1-3 of the drawings, in which like numbers designate like parts.

FIGS. 1A and 1B are respective top and bottom views of an animal harness 100 according to the principles of the present invention. Animal harness 100 includes a length of strap 101, which generally lies longitudinally along a portion of the back of an animal during use (see FIGS. 2A-2C and the discussion below). A ring 102 or similar structure suitable for attachment to an animal leash is connected by a loop formed at the end of strap 101. Harness 100 also includes a second length of strap 103, which extends longitudinally along a length of the forward underside of the animal when in use. The lengths of strap 101 and strap 103 vary depending on the size of the animal.

A third length of strap 104 is adapted to extend partially around the forward chest/lower neck area of the animal, generally in front of the legs and below the neck proper. A male portion 302a of a clasp system, discussed in detail below in conjunction with FIGS. 3A-3D, is fastened to a first end of strap 104 by a loop formed by stitching 105. Strap 101 is fastened to strap 104 by stitching 107.

Strap 104 extends through a length adjuster 108, loops through a ring 109, and then doubles back through length adjuster 108. The end of strap 104 is then fastened to the main body of strap 104 by stitching 110 (FIG. 1B). A slide 111 maintains the doubled portions of strap 104 together.

A first end of a fourth length of strap 112 includes female portion 301a of the clasp system fastened by a loop formed by stitching 113. When clasp female portion 301a on strap 112 mates with clasp male portion 302a on strap 104, a complete adjustable loop is formed, which extends around the forward chest/lower back and the front portion of the back of the animal as shown in FIG. 2A.

Strap 112 extends through length adjuster 114, though ring 109, and then doubles back through length adjuster 114. The second end of strap 112 is fastened to the main body of strap 112 by stitching 115 (FIG. 1B). A slide 116 maintains the doubled portions of strap 112 together.

A fifth length of strap 117 includes a second male clasp portion 302b fastened with a loop formed by stitching 118. Strap 117 is attached to strap 101 by stitching 119.

Strap 117 extends through a length adjuster 120, a loop formed at the end of strap 103 by stitching 121, and then through an aperture provided in female clasp portion 301b, as described below. Strap 117 then doubles back through the loop at the end of strap 103, through length adjuster 120, and then terminates with stitching 122 to the main body of strap 117. A slide 123 keeps the doubled portion of strap 117 together.

Harness 100 can be made from a number of different available materials. For example, straps 101, 103, 104, 112, and 117 can be constructed of conventional weaved nylon webbing, leather, or similar durable material. Hardware, such as rings 102 and 109, clasps 301-302, length adjusters 108, 114, and 120, and slides 111, 116, and 123 can be fabricated from metal (e.g. aluminum or stainless steel), plastic, or a similar suitable durable material.

Figure 2A:
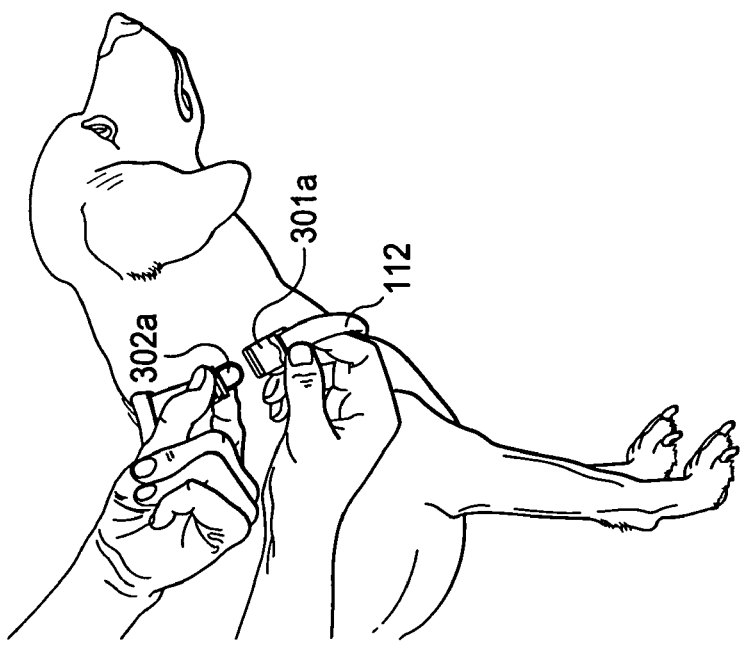
Figure 2C:
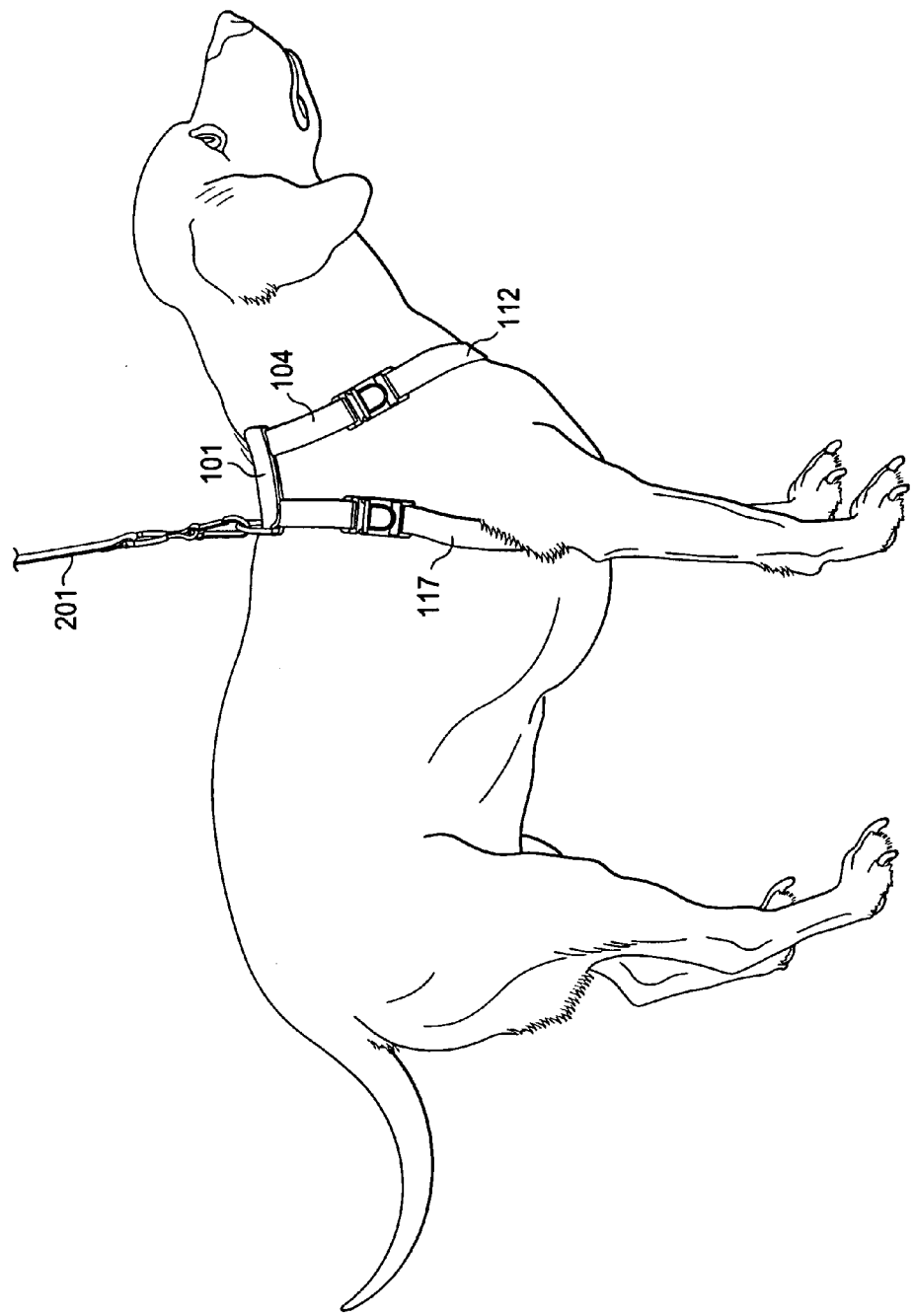

FIGS. 2A-2C illustrates a typical use of animal harness 100. In this example, a human pet owner wraps strap 104 and strap 114 around the lower neck/forward chest area of a small dog (FIG. 2A). One leg of the animal, in FIG. 2 the opposing leg (not visible) is directed through the space defined between straps 101, 103, 104, and 117. The pet owner then inserts male clasp portion 302a into female clasp portion 301a.

The pet owner next wraps strap 117 around the torso of the animal, behind the front legs. Male clasp portion 302b inserts into female clasp portion 301b. Ring 109 is generally disposed on the front chest of the animal and the pet owner can adjust the fit of harness 100 using length adjusters 108, 114, and 120. A conventional leash 201 can then be attached to ring 102.

FIGS. 3A-3D show the harness clasps in further detail. In particular, each clasp includes a female portion 301 and a corresponding male portion 302.

In the illustrated embodiment, each portion of the clasp includes a slot 303a, 303b through which the end 304a, 304b of the corresponding harness strap is inserted to form a loop. The loop is then closed by stitching strap ends 304a, 304b to the corresponding strap bodies thereby securing the given female portion 301 or male portion 302 of the clasp to the corresponding harness strap (e.g. by stitching 105, 113, 118, 122 of FIGS. 1A and 1B).

Male portion 302 includes a depressible button 305 having an upper surface 306 which is slightly angled upward towards slot 303b. Female portion 301 includes a frame 307 dimensioned to received male portion 302.

Figure 3A:
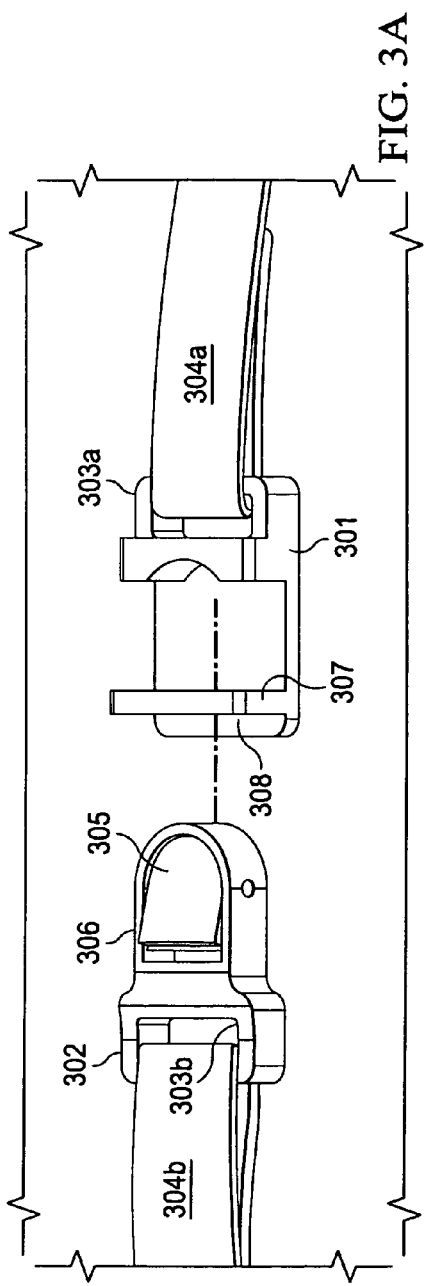
FIG. 3A-3D are more detailed drawings of the clasp system shown in FIGS. 1A-1B.
Figure 3B:
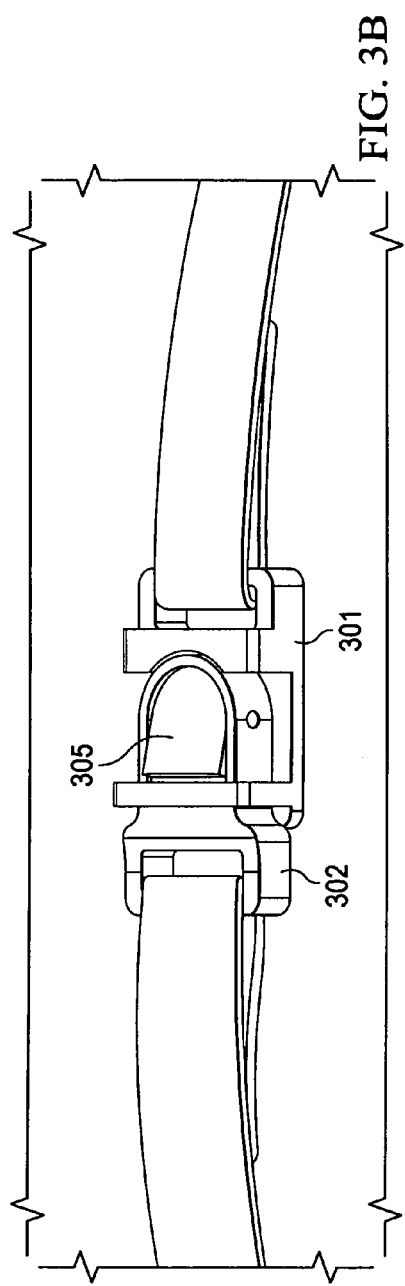
Figure 3C:
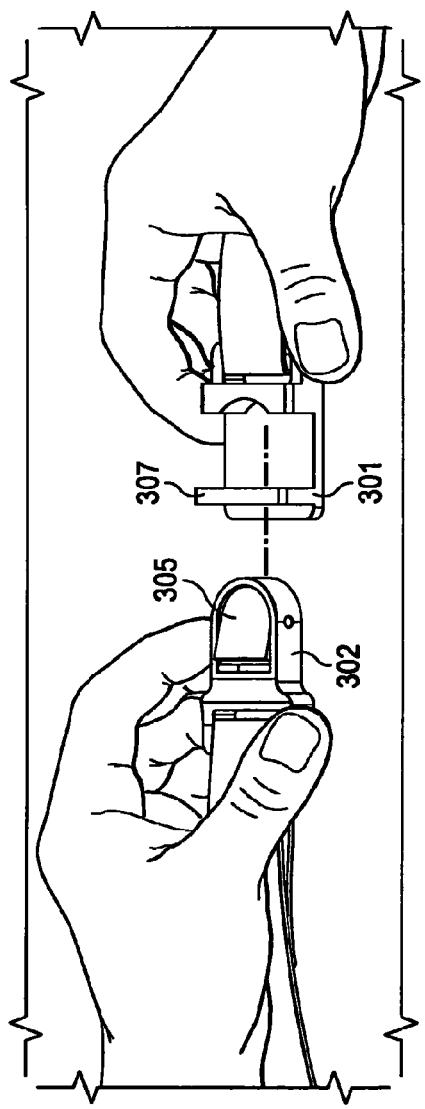

During use, male portion 302 is manually pushed through aperture 308 of frame 307 of female portion 301. As the upper surface 306 of depressible button 305 passes under frame 307, depressible button 305 is forced downward from its normally upwardly biased position thereby allowing male portion 302 to be received by female portion 301. Once the raised rear edge of depressible button 305 passes under frame 307, depressible button 305 snaps upward, to its normal upwardly biased position, such that the raised rear edge of depressible button 305 holds male portion 302 in engagement with female portion 301 (FIG. 3B).

Figure 3D:
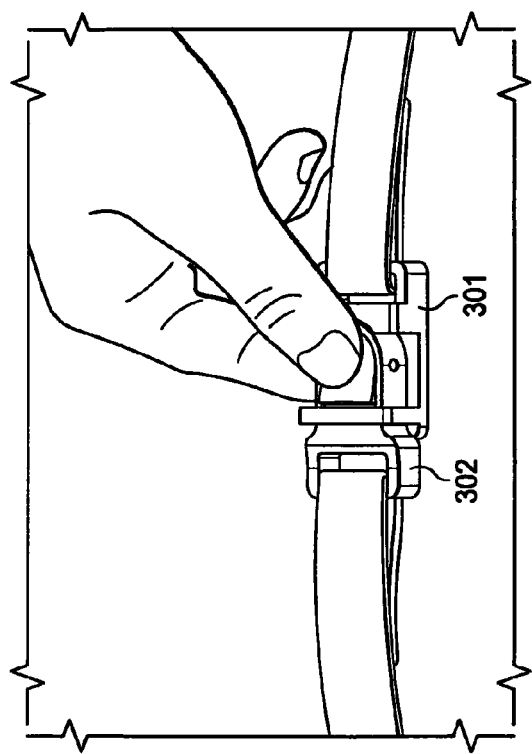

To disengage male portion 302 and female portion 301, and consequently release the ends 304a, 304b of the corresponding harness straps, depressible button 305 is manually depressed, which allows angled surface 306 to pass through aperture 308 of frame 307, and male portion 302 is simply manually slid under frame 307 of female portion 301 (FIG. 3D).

Clasp mechanisms according to the present inventive principles are advantageously much easier to use than the clasps found on traditional pet harnesses. In particular, the human companion need only push male portion 302 into female portion 301 to snap the corresponding harness straps together around the animal. To release the animal from the harness, the human companion need only push the corresponding depressible buttons 305 and gently pull the ends of the harness straps apart.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:
1. An animal harness comprising:
 a first length of strap for disposition along a portion of a back of an animal;
 a second length of strap for disposition along a portion of an underside of the animal;
 a third length of strap having a first end fastened to a first part of a clasp system and a second end looped around a ring, a first end of the first length of strap fastened to the third length of strap;

a fourth length of strap having a first end looped around the ring and a second end fastened to a second part of the clasp system;

a fifth length of strap having a first end attached to a third part of the clasp system and a second end attached to a forth part of the clasp system, wherein a second end of the first length of strap is fastened to the fifth length of strap and wherein a first end of the second length of strap is looped around the fifth length of strap and a second end of the second length of strap is looped around the ring; and wherein the third and fourth lengths of strap are adapted for disposition around the animal in front of a leg when the first and second parts of the clasp system are fastened together and the fifth length of strap is adapted for disposition around the animal in back of the leg when the third and fourth parts of the clasp system are fastened together.

2. The animal harness of claim 1, wherein:

the first part of the clasp system comprises a base and a frame extending from the base to define an aperture; and the second part of the clasp system comprises a depressible member for inserting through the aperture of the first part of the clasp system when depressed and for snapping into retention by the frame of the first part of the clasp system after release.

3. The animal harness of claim 1, wherein:

the third part of the clasp system comprises a base and a frame extending from the base to define an aperture; and the fourth part of the clasp system comprises a depressible member for inserting through the aperture of the third part of the clasp system when depressed and for snapping into retention by the frame of third part of the clasp system after release.

4. The animal harness of claim 1, wherein the third length of strap is further looped through a length adjustment mechanism.

5. The animal harness of claim 1, wherein the fourth length of strap is further looped through a length adjustment mechanism.

6. The animal harness of claim 1, wherein the fifth length of strap is further looped through a length adjustment mechanism.

7. The animal harness of claim 1, further comprising a loop fastened to the first length of strap for receiving a leash.

8. The animal harness of claim 1, wherein at least a selected one of the first, second, third, fourth, and fifth lengths of strap is fabricated from a weaved material.

9. The animal harness of claim 1, wherein the first length of strap is fastened to the third and fifth lengths of strap with stitching.

\* \* \* \* \*